(12) United States Patent
Kawashima et al.

(10) Patent No.: US 7,438,704 B1
(45) Date of Patent: Oct. 21, 2008

(54) OPEN INSTILLATION CONTAINER AND METHOD OF MANUFACTURING THE CONTAINER

(75) Inventors: Yoichi Kawashima, Osaka (JP); Yukio Kusu, Osaka (JP)

(73) Assignee: Santen Pharmaceutical Co., Ltd., Osaka (JP)

( * ) Notice: Subject to any disclaimer, the term of this patent is extended or adjusted under 35 U.S.C. 154(b) by 586 days.

(21) Appl. No.: 10/049,733

(22) PCT Filed: Aug. 14, 2000

(86) PCT No.: PCT/JP00/05457

§ 371 (c)(1),
(2), (4) Date: Nov. 8, 2002

(87) PCT Pub. No.: WO01/12124

PCT Pub. Date: Feb. 22, 2001

(30) Foreign Application Priority Data

Aug. 17, 1999 (JP) .................................. 11-230651

(51) Int. Cl.
*A61F 9/00* (2006.01)
*B65D 1/08* (2006.01)
*B65D 23/10* (2006.01)

(52) U.S. Cl. ........................ 604/295; 222/567; 222/420; 222/205; 604/212; 604/298; 215/381; 215/384

(58) Field of Classification Search .............. 206/438 X, 206/5.1, 222 X, 363; 200/367; 215/12.1, 215/344, 381, 384; 604/300, 295, 212, 298; 222/420, 571, 567, 569, 205, 212

See application file for complete search history.

(56) References Cited

U.S. PATENT DOCUMENTS

| | | | | |
|---|---|---|---|---|
| 3,945,381 A | * | 3/1976 | Silver | 604/301 |
| 4,605,398 A | * | 8/1986 | Herrick | 604/300 |
| 4,723,687 A | * | 2/1988 | Kutterer | 222/83 |
| 5,076,474 A | | 12/1991 | Hansen | |
| 5,261,572 A | * | 11/1993 | Strater | 222/215 |
| 5,464,122 A | | 11/1995 | Lifshey | |
| 5,624,057 A | | 4/1997 | Lifshey | |
| 5,718,334 A | * | 2/1998 | Demel | 206/438 |
| 6,129,248 A | * | 10/2000 | Hagele | 222/420 |

FOREIGN PATENT DOCUMENTS

| | | |
|---|---|---|
| EP | 0312725 A | 4/1989 |
| HU | 206453 | 7/1992 |
| HU | 206453 B | 7/1992 |
| JP | 555936/1977 | 11/1978 |
| JP | 01-146552 A | 6/1989 |
| JP | 2-52758 | 2/1990 |
| JP | 4-117636 | 10/1992 |

(Continued)

*Primary Examiner*—Jila M Mohandesi
(74) *Attorney, Agent, or Firm*—The Webb Law Firm

(57) ABSTRACT

A bottomed conical hollow 6b is formed in a tip end of the container body A formed of a thermoplastic material with a liquid filled and sealed therein simultaneously during the molding process, the hollow having an inside diameter enlarging toward the tip end, and a small-diameter instilling hole 6c is penetrated through the bottom of the hollow 6b for controlling, at a set quantity, the liquid pushed out of the container body A.

9 Claims, 11 Drawing Sheets

FOREIGN PATENT DOCUMENTS

| | | |
|---|---|---|
| JP | 60-86341 | 3/1994 |
| JP | 07-275322 | 10/1995 |
| JP | 09-290456 A | 11/1997 |
| JP | 2001-120638 | 8/2001 |
| JP | 2001-120639 | 8/2001 |
| WO | WO 96/00173 A | 1/1996 |
| WO | WO 99/57030 | 11/1999 |

* cited by examiner

OPEN INSTILLATION CONTAINER AND METHOD OF MANUFACTURING THE CONTAINER

TECHNICAL FIELD

This invention relates to an improvement in eye drop containers for containing an ophthalmic solution for medical use and in the method of manufacturing the same.

BACKGROUND ART

Eye drops for medical use must be applied in a controlled, fixed quantity.

An ordinary eye drop container in wide use, which can control the quantity of application, has an injection molded inner nozzle tip fitted in and fixed to a tubular portion of a molded container body. This nozzle tip defines a hollow in the form of a bottomed cone having an inside diameter increasing toward a tip end thereof, and a small diameter instilling hole extending through a central position of the bottom of the hollow for controlling the quantity of the ophthalmic solution pushed out of the container body. An injection molded cap, having a stopper-like projection for fitting in and sealing the hollow in the form of a bottomed cone, is meshed with and mounted on a male screw formed on an outer peripheral surface of the tubular portion of the container body.

This eye drop container, with the hollow in the form of a bottomed cone and the small diameter instilling hole extending through the central position of the bottom of the hollow, can reliably instill the solution constantly in a fixed quantity as the container body is pressed. However, dies are required to injection mold the three components separately from one another, and each component requires a cleaning and sterilizing operation, which results in increased manufacturing costs.

On the other hand, unitary molded containers are used which achieve reduced manufacturing costs and yet can retain the function of an eye drop container. Such a container has a container body formed of a thermoplastic material (popularly called a bottle pack type container in which a solution is filled and sealed at the time of blow molding or vacuum molding. A cap, having a needle-like projection formed integral therewith for penetrating and forming a instillation channel in the tip portion of the container body, is detachably meshed with a male screw formed on an outer peripheral surface on the tip portion of the container body. The cap is meshed further downward than the usual stopping position, whereby the needle-like projection of the cap penetrates and forms an instillation channel in the tip portion of the container body.

The above eye drop container of the bottle pack type has the advantage of reduced manufacturing costs over the eye drop container using the inner nozzle tip formed by injection molding. However, since the instillation channel is formed by the needle-like projection of the cap breaking through the tip end of the container body, the cap must be properly screwed to a further tightened position from the usual stopping position. Otherwise, the shape and size of the instillation channel may lack uniformity, resulting in variations in the quantity of ophthalmic solution pushed out of the container body.

When the cap is tightened excessively from the usual stopping position after the tip end of the container body is penetrated to form a instillation channel therein, the instillation channel is enlarged by the needle-like projection of the cap with each excessive tightening turn. Thus, the quantity of the solution to be pushed out of the container body may gradually increase.

It is therefore necessary to provide sufficient information as to the proper use of the eye drop container. However, even with sufficient information given, it has been difficult to avoid the above misuse because users are inclined to mesh the cap without enough caution for penetrating the instillation channel or tighten the cap excessively.

DISCLOSURE OF THE INVENTION

This invention has been made having regard to the state of the art noted above, and its primary objective is to provide an eye drop container to reliably instill a solution constantly in a fixed quantity as the container body is pressed, without impairing the advantage in manufacturing costs of the container body of the bottle pack type. A second primary object is to provide a manufacturing method that can promote a reduction in manufacturing cost.

The eye drop container of this invention is characterized by a bottomed conical hollow formed in the tip end of the container body, formed of a thermoplastic material, with the liquid filled and sealed therein simultaneously with the molding process, the hollow having an inside diameter enlarging toward the tip end, and a small-diameter instilling hole penetrating through the bottom of the hollow for controlling, at a set quantity, the liquid pushed out of the container body.

According to the above characteristic construction, the container body formed of a thermoplastic material (bottle pack type container body) is used in which a liquid is filled and sealed simultaneously with blow molding, vacuum molding or the like, and the bottomed conical hollow having an inside diameter enlarging toward the tip end, and the small-diameter instilling hole for controlling, at a set quantity, the liquid pushed out of the container body, is formed directly in the tip end of the container body. Thus, less dies are required for manufacturing the container body than an eye drop container using an injection-molded inner nozzle tip. The presence of the bottomed conical hollow and small-diameter instilling hole allows a fixed quantity of liquid to be dripped reliably whenever the container body is pressed.

Thus, only the bottomed conical hollow and small-diameter instilling hole are formed to allow the tip end of the container body of the bottle pack type to exhibit an inner nozzle tip function. The liquid may be instilled reliably and constantly in a fixed quantity without impairing the advantage in manufacturing costs of the container body of the bottle pack type.

In the eye drop container of this invention, it is extremely important to provide a hollow, which is shaped so that a small-diameter instilling hole can be formed for controlling each drop at a set quantity, in a tip end of a container body formed of a thermoplastic material with the liquid filled and sealed therein simultaneously during the molding process. Thus, a semi-finished eye drop container having such a hollow falls within the scope of this invention also. The construction of such an eye drop container is characterized in that, as defined in claim 2, the container includes a bottomed conical hollow formed in a tip end of a container body formed of a thermoplastic material with a liquid filled and sealed therein simultaneously with a molding process, the hollow having an inside diameter enlarging toward the tip end, wherein the hollow is shaped so that a small-diameter instilling hole can be formed in a bottom of the hollow for controlling, at a set quantity, the liquid pushed out of the container body toward the bottom of the hollow.

The eye drop container according to one preferred embodiment of this invention is characterized by the said container body having a threaded portion formed integral therewith for detachably meshing a cap to seal the hollow of the container body.

According to the above characteristic construction, the threaded portion for meshing with the cap may be formed simultaneously with the formation of the container body. This promotes low manufacturing costs.

One preferred embodiment of the eye drop container invention is that the said hollow has a range of depth of 2 to 7 mm.

According to the above characteristic construction, the hollow should desirably be formed as deep as possible, preferably in the range of 5 to 7 mm, and most preferably 6 mm, from the technical point of view of yield and assuring a stable inner nozzle tip function. If the depth of the hollow is smaller than the desired range of value, a tip end of the hollow, i.e. the instilling hole, is covered with accumulated liquid, under surface tension, within an annular space (a liquid reservoir) of the container around the hollow. This causes an inconvenience when liquid accumulates within the liquid reservoir and then may be pushed out through the instilling hole, under pressure applied when the container is gripped with a user's hand or finger(s). If a depth of the hollow is larger than the desired range of value, on the other hand, the hollow will likely form a crack-formation during the hollow-forming process. The depth of 6 mm is found to be an optimum solution for meeting these contrary conditions. However, in case of a liquid medicine of lower surface tension, the depth of the hollow can be designed smaller, since the liquid quantity accumulated within the reservoir is smaller and thus the depth is not required to be so large.

Another preferred embodiment of this eye drop container invention is characterized by the said hollow that has an opening diameter adjacent to the tip end in a range of 2 to 4 mm.

According to the above characteristic construction, the size is adjusted within the range of $\phi 2.0$ mm to $\phi 4.0$ mm according to the liquidity (surface tension and viscosity) of the liquid filled into the container body.

To make the quantity of each drop constant (i.e. adjust each drop to be within the range of the 25 to 50 microliters according to purpose), the opening diameter is reduced for a liquid of high surface tension, and the opening diameter is enlarged for a liquid of low surface tension.

The method of manufacturing the eye drop container according to one preferred embodiment of this invention is characterized by pressing, in the direction of a container axis and against the tip end of the container body with the liquid filled and sealed therein simultaneously during the molding process, a convex forming die to form the said hollow, and a needle-like forming die for forming said small-diameter instilling hole.

According to the above characteristic feature, the container body formed of a thermoplastic material (bottle pack type container body) is used in which a liquid is filled and sealed simultaneously with blow molding, vacuum molding or the like, and the bottomed conical hollow having an inside diameter enlarging toward the tip end, and the small-diameter instilling hole for controlling, at a set quantity, the liquid pushed out of the container body, is formed directly in the tip end of the container body. Thus, less dies are required for manufacturing the container body than an eye drop container using an injection-molded inner nozzle tip member. The presence of the bottom conical hollow and small-diameter instilling hole allows a fixed quantity of liquid to be dripped reliably whenever the container body is pressed.

Moreover, since the convex forming die for forming the hollow, and the needle-like forming die for forming the instilling hole are only pressed into contact in the direction of a container axis, the bottomed conical hollows and small-diameter instilling holes may be formed in numerous container bodies while the latter are being transferred.

Thus, only the bottomed conical hollow and small-diameter instilling hole are formed to allow the tip end of each container body of the bottle pack type to exhibit an inner nozzle tip function. In addition, numerous container bodies may be processed while being transferred. The eye drop containers for reliably instilling liquid constantly in a fixed quantity may be manufactured with an advantage in terms of manufacturing cost.

Further, the method of manufacturing the above-described eye drop container having a hollow as a semi-finished product is characterized, as defined in claim 7, by the step of pressing a convex forming die for forming the hollow, in the direction of a container axis and against the tip end of the container body with the liquid filled and sealed therein simultaneously during the molding process.

The method of manufacturing the eye drop container according to one preferred embodiment of this invention is characterized by heating at least a portion formed by the said convex forming die, to a non-buckle temperature by the heating means before the forming process.

According to the above characteristic feature, the shaping precision and yield in forming the hollows in the tip ends of the container bodies may be improved.

The method of manufacturing the eye drop container according to one preferred embodiment of this invention is characterized by forming the hollow and instilling hole in the tip end of the container by using a single forming die integrating the said convex forming die and said needle-like forming die.

According to the above characteristic feature, the bottomed conical hollow and small-diameter instilling hole may be formed with a single forming die. This achieves an improvement in manufacturing efficiency, and a simplification of the manufacturing equipment.

BEST MODE FOR CARRYING OUT THE INVENTION

[First Embodiment]

Figure 1:
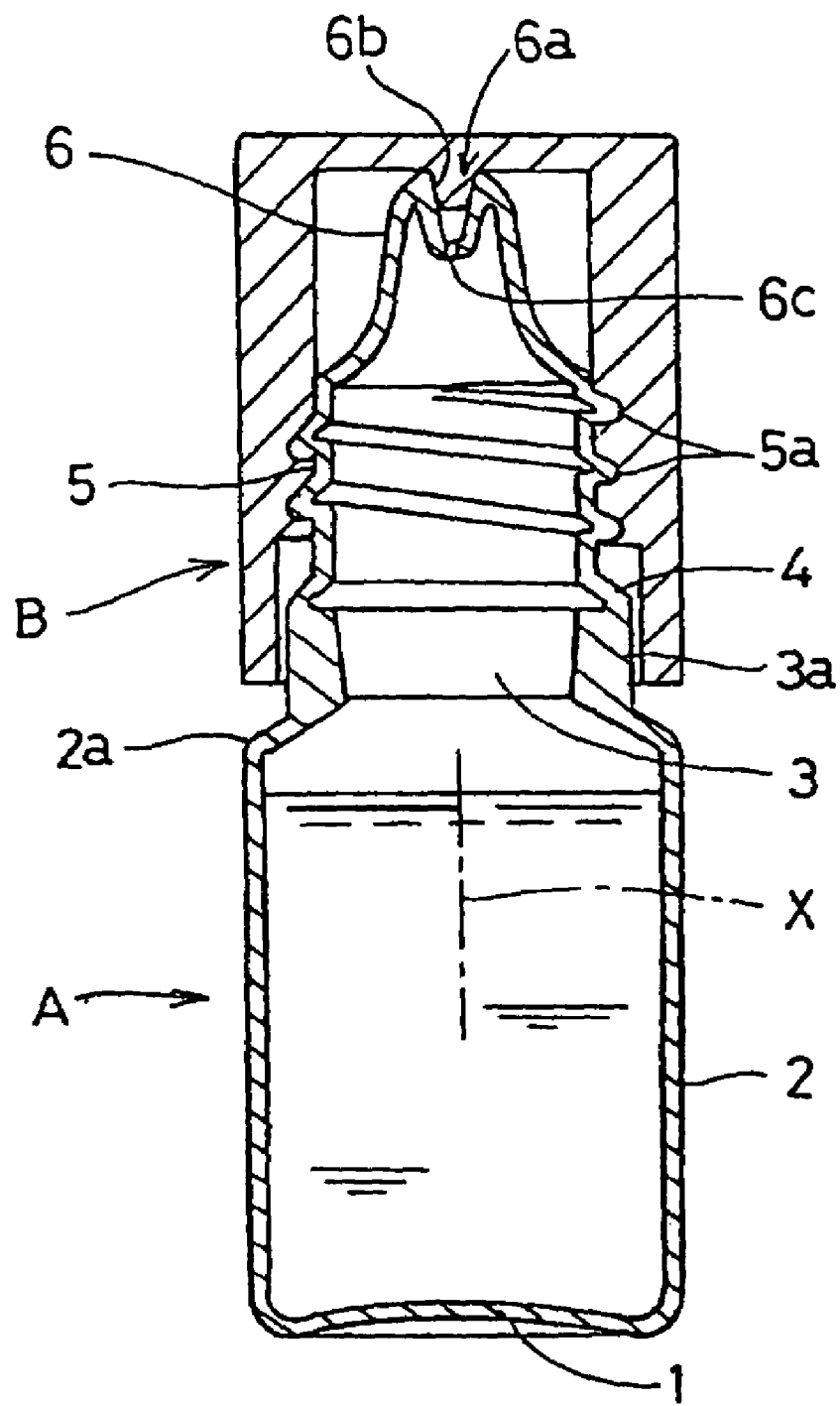
FIG. 1 is a sectional front view showing the eye drop container of this invention.

FIG. 1 shows an eye drop container for use mainly in medical treatment of this invention, which includes a container body A formed of a flexible, thermoplastic material and having a predetermined quantity of liquid medicine filled at the time of blow molding or vacuum molding, and a cap B detachably meshed with a male screw 5a formed on an outer peripheral surface of a threaded tube portion 5 of the container body A.

The container body A includes a circular bottom 1 curved inwardly, a hollow, cylindrical barrel portion 2 continuous with peripheral edges thereof, a cylindrical neck portion 3 continuous with a shoulder 2a of the barrel portion 2, an annular stepped portion 4 protruding diametrically outward from an upper position of the neck portion 3, the threaded tube portion 5 continuous upward therefrom and having the male screw 5a, and an instilling tube portion 6 continuous upward therefrom and having an instilling opening 6a. The neck portion 3 has plate-like ribs 3a formed integral therewith in two circumferential positions opposed to each other across a container axis X to extend along the container axis X.

The instilling tube portion 6 of the container body A defines a hollow 6b in the form of a bottomed cone having an inside diameter enlarging toward the instilling opening 6a. The hollow 6b has a small-diameter instilling hole 6c formed in the bottom thereof for controlling, at a set quantity, the liquid pushed out of the container body A as the barrel portion 2 is pressed with fingertips.

The hollow 6b has a depth in the range of 2 to 7 mm, preferably in the range of 5 to 7 mm, and most preferably 6 mm. The shedding opening 6a has a diameter (top diameter) adjusted in the range of φ2.0 mm to φ4.0 mm according to the liquidity (surface tension and viscosity) of the liquid medicine.

To make the quantity of each drop constant (i.e. adjust each drop to be within the range of the 25 to 50 microliters according to purpose), the diameter of the instilling opening 6a is reduced for a liquid of high surface tension, and the diameter of the instilling opening 6a is enlarged for a liquid of low surface tension.

Further, the instilling hole 6c is formed by using a needle having a diameter in the range of φ0.1 mm to φ0.8 mm. The diameter of the needle, preferably, is smaller, and a size in the order of φ0.2 mm is the most desirable. However, too small a size would make the formation technically difficult. In practice, therefore, a needle in the range of φ0.4 mm to φ0.6 mm is used.

The thermoplastic material for forming the container body A may be polyethylene, polyethylene-polypropylene, polypropylene, polyethylene terephthalate, polycarbonate or the like. The cap B has a stopper-like projection 8 formed integral therewith for fitting in and sealing the hollow 6b of the container body A when the cap is meshed with the male screw 5a of the container body A.

The method of manufacturing the container body A before forming the hollow 6b and instilling hole 6c is well known in the art, and will be described briefly.

Figure 2:
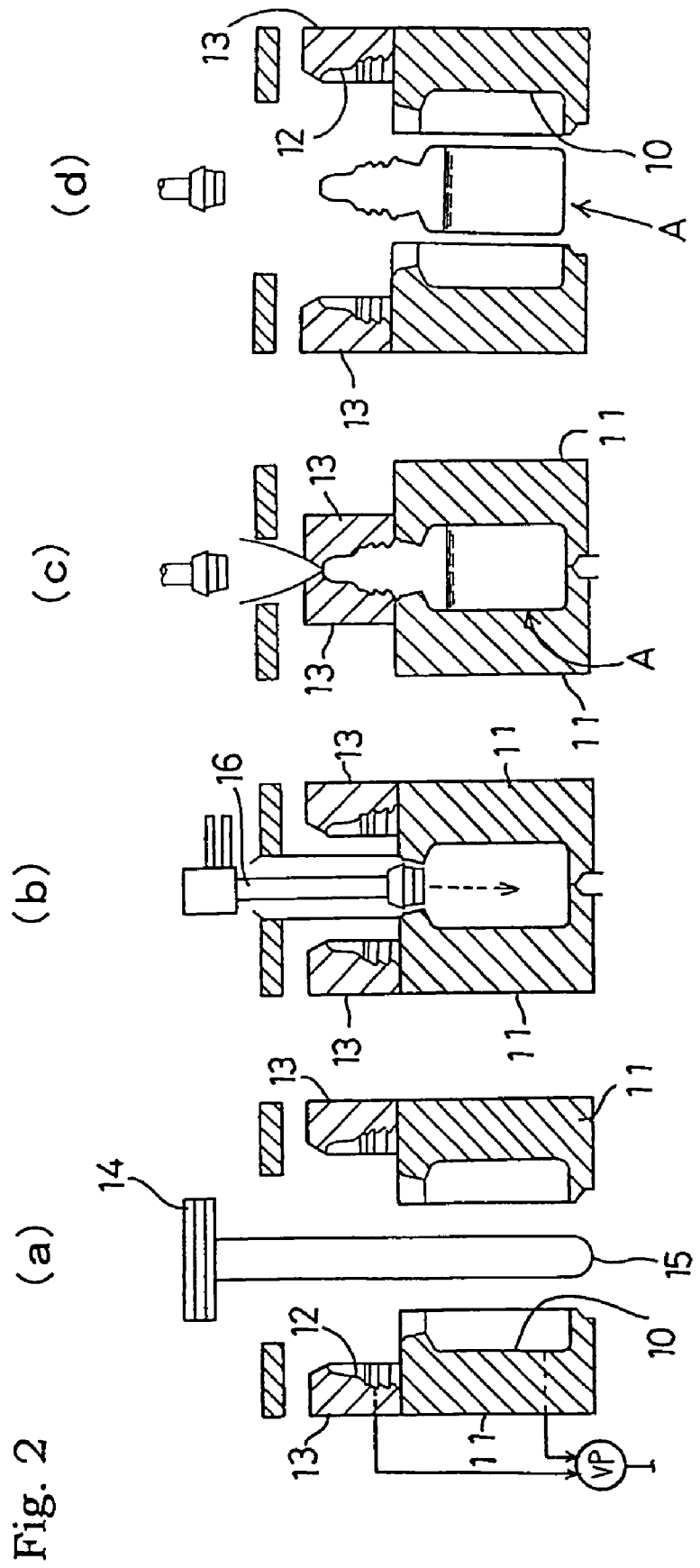
FIG. 2 is an explanatory view of a process of blow molding or vacuum molding a container body.

As shown in FIG. 2(a), in an opened state of a pair of main forming dies 11 defining a first cavity 10 for forming the range from the annular stepped portion 4 to the bottom 1 of container body A, and a pair of auxiliary forming dies 13 defining a second cavity 12 for forming the threaded tube portion 5 and the shedding tube portion 6 of container body A. An elongate, hollow, tubular parison 15 formed of a semi-solid thermoplastic material and having a predetermined length is extruded vertically through a space between the two dies 11 and 13 from an extrusion head 14 disposed above.

Next, as shown in FIG. 2(b), a forming process is carried out with the main forming dies 11 closed, while expanding the parison 15 along forming surfaces 11a of the main forming dies 11 by a compressed air blowing action or vacuum action. In this state, as shown in FIG. 2(c), a predetermined quantity of liquid (liquid medicine) is filled in from a medicine supply pipe 16.

After this liquid filling step, as shown in FIG. 2(d), a forming process is carried out with the auxiliary forming dies 13 closed, while expanding the parison 15 along forming surfaces 13a of the auxiliary forming dies 13 by a compressed air blowing action or vacuum action. The liquid, filled simultaneously with the formation, is sealed (enclosed).

Next, a process is carried out for forming the bottomed conical hollow 6b and the small-diameter instilling hole 6c in the instilling tube portion 6 at the tip end of the container body A formed by blow molding or vacuum molding as described above. Each manufacturing method in the three modes for this process will be described hereinafter.

[Manufacturing Method of the First Mode]

The manufacturing method of the first mode shown in FIGS. 3(a)-(d) uses a convex forming die 20 formed of metal for forming the bottomed conical hollow 6b, and a needle-like forming die 21 formed of metal for forming the instilling hole 6c.

The convex forming die 20 includes a mounting shaft 20A having, formed at the distal end thereof, a conical forming projection 20B for forming the bottomed conical hollow 6b, and a bowl-shaped (bell-shaped) forming surface 20C for forming the outer peripheral surface of the shedding tube portion 6 of the container body A. The needle-like forming die 21 has a needle-like forming projection 21B formed at the distal end of the mounting shaft 21A for forming the small-diameter instilling hole 6c.

Figure 3:
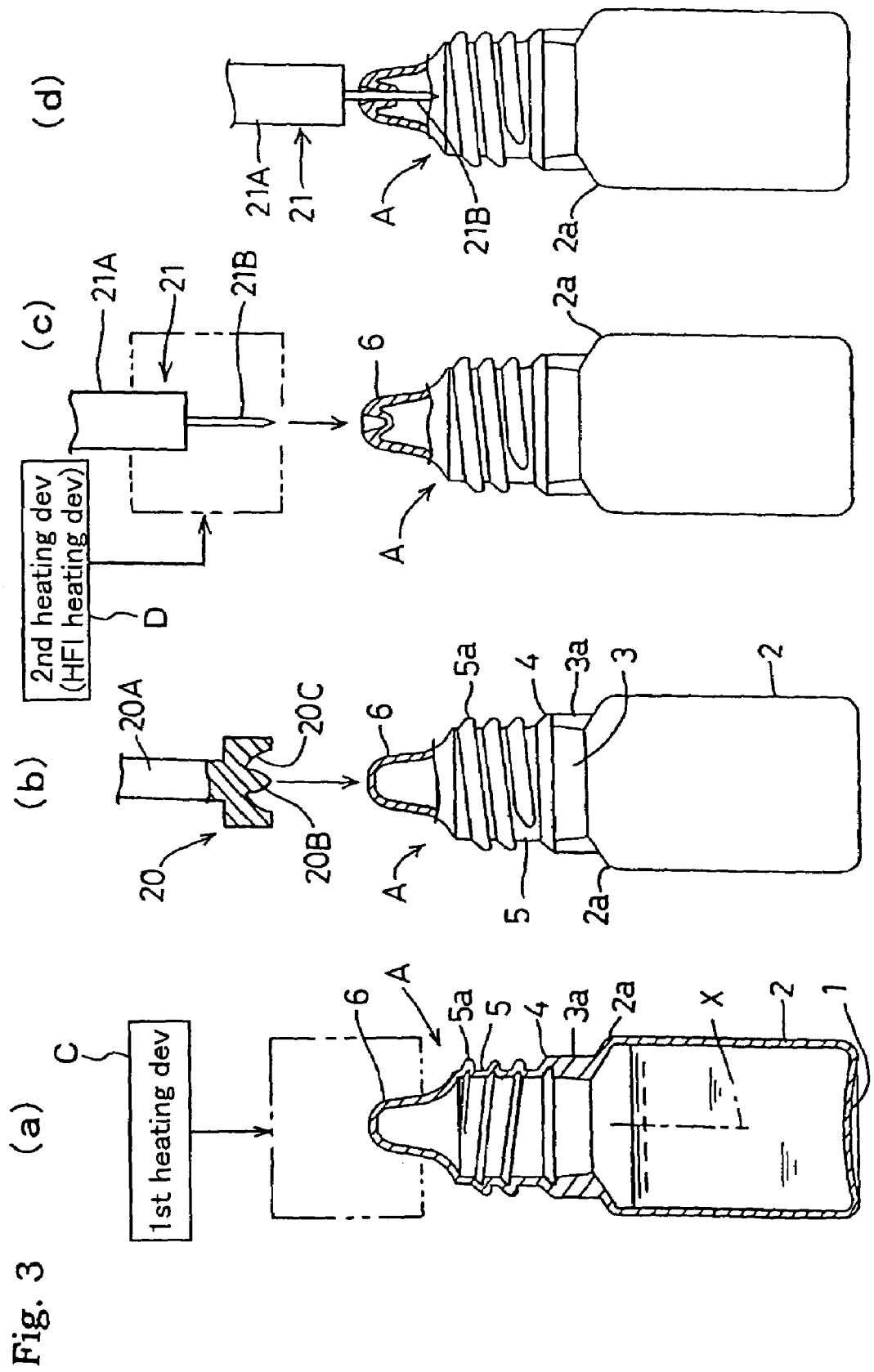
FIG. 3 is an explanatory view of the manufacturing method in the first mode.

In the manufacturing method of the first mode, as shown in FIG. 3(a), part of the instilling tube portion 6 at the tip end of the container body A is heated to room temperature or 70° C. to 150° C. by a initial heating device C such as warm air, a halogen lamp or laser beam. The heating temperature depends on the material and the shape of the container body A, but a temperature for slightly softening the tip end of the container body A is desirable.

Where the thermoplastic material of container body A is a soft resin material such as polyethylene, the tip portion will buckle unless heated. It is therefore necessary to heat, with the initial heating device C, at least the portion to be formed by the convex forming die 20, to a non-buckling temperature before formation. However, in the case of a resin material and a shape that can withstand the buckling force, i.e. withstand a pressure applied along the container axis X by the convex forming die 20, the formation may be carried out at room temperature.

Next, as shown in FIG. 3(b), before the part of the instilling tube portion 6 of the container body A which has been heated by the initial heating device C cools, the convex forming die 20 is pressed in the direction of container axis X to form the bottomed conical hollow 6b, having the inside diameter increasing toward the instilling opening 6a, in the instilling tube portion 6 of container body A.

At this time, the bowl-shaped forming surface 20C of the convex forming die 20 can remove burrs formed at the time of blow forming which are projecting from the outer peripheral surface of the instilling tube portion 6 of container body A.

The convex forming die 20 itself is temperature-controlled in a range from room temperature to 150° C. according to the shape and wall thickness of the instilling tube portion 6 of the container body A to be formed. The heating temperature should preferably be as low as possible, taking into account cooling solidification of the tip end of the instilling tube portion 6.

The convex forming die 20 can be simply changed according to the fluidity of the liquid to be filled.

Next, as shown in FIGS. 3(c) and (d), the needle-like forming die 21 is pressed in the direction of the container axis X against the central position on the bottom of the hollow 6b formed in the instilling tube portion 6 of the container body A, to form the small-diameter instilling hole 6c for controlling a set quantity of the liquid pushed out of the container body A as the barrel portion 2 is squeezed with the fingertips.

During the process of forming the instilling hole 6c with the needle-like forming projection 21B of the needle-like forming die 21, two ways are proposed. First, the operation is carried out with the needle-like forming projection 21B remaining at room temperature, or secondly, the needle-like forming projection 21B is heated. The way to be employed is selected depending on various conditions including the resulting shape of the small-diameter instilling hole 6c, the shape of the hollow 6b, and the shape, material and manufacturing cost of the remaining components/portions of the container. If just heating the needle-like forming projection 21B of the needle-like forming die 21 is required, the preferable temperature for melting the resin material of the container should be in the range of 130° C. to 180° C.

The needle-like forming die 21 is heated by a second heating device D such as high frequency induction heating, a halogen lamp or warm air. The mounting shaft 21A carrying the needle-like forming die 21 is cooled by a cooling device E such as a water jacket or compressed air.

At the point where the needle-like forming die 21 has cooled to a predetermined temperature, the needle-like forming die 21 is withdrawn along the container axis X from the instilling tube portion 6 of the container body A which has been formed into the predetermined shape.

The needle-like forming die 21 may be given a surface treatment such as plating, Teflon coating or special plating to improve separability or releasability from the resin. This surface treatment, preferably, is the type that withstands high temperatures and is not easily separable.

[Manufacturing Method of the Second Mode]

As in the first mode, the manufacturing method of the second mode shown in FIGS. 4(a)-(d), uses a convex forming die 20 made of metal for forming the bottomed conical hollow 6b, and a needle-like forming die 21 made of metal for forming the instilling hole 6c.

The convex forming die 20 includes a mounting shaft 20A having only a conical forming projection 20B formed at the distal end thereof for forming the bottomed conical hollow 6b. The needle-like forming die 21 has, formed at the distal end of the mounting shaft 21A, a needle-like forming projection 21B for forming the small-diameter instilling hole 6c, and a bowl-shaped (bell-shaped) forming surface 21C for forming the outer peripheral surface of the instilling tube portion 6 of the container body A. In addition, the needle-like forming projection 21B has a proximal end 21b thereof formed to be conical fitting with the hollow 6b formed by the conical forming projection 20B.

Figure 4:
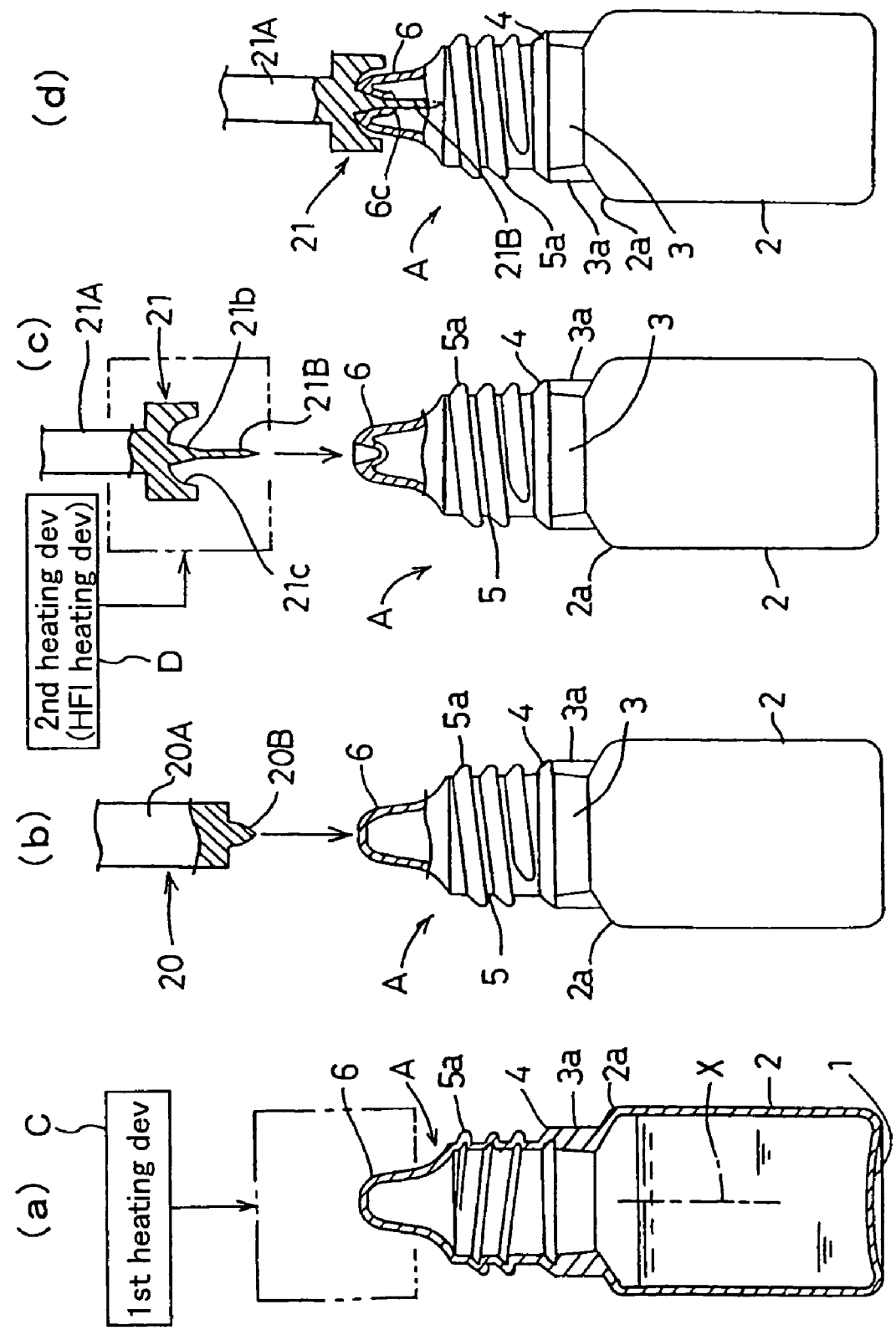
FIG. 4 is an explanatory view of a manufacturing method in the second mode.

In the first mode, as shown in FIG. 3(b), the burrs formed at the time of blow forming which project from the outer peripheral surface of the instilling tube portion 6 of the container body A are removed at the time of formation by the convex forming die 20. In the second mode, as shown in FIG. 4(c), the burrs formed at the time of blow forming which project from the outer peripheral surface of the instilling tube portion 6 of the container body A are removed at the time of formation by the needle-like forming die 21. The other aspects are the same as in the first mode.

[Manufacturing Method of the Third Mode]

The manufacturing method of the third mode shown in FIGS. 5(a)-(d) uses a single forming die 22 made of metal and integrating a convex forming die for forming the bottomed conical hollow 6b, and a needle-like forming die for forming the instilling hole 6c.

The single forming die 22 includes a mounting shaft 22A which has formed the distal end thereof, a conical forming projection 22B for forming the bottomed conical hollow 6b, and a bowl-shaped (bell-shaped) forming surface 22D for forming the outer peripheral surface of the instilling tube portion 6 of container body A. The conical forming projection 22B has a needle-like forming projection 22C formed integrally and coaxially with the distal end thereof for forming the small-diameter instilling hole 6c.

Figure 5:
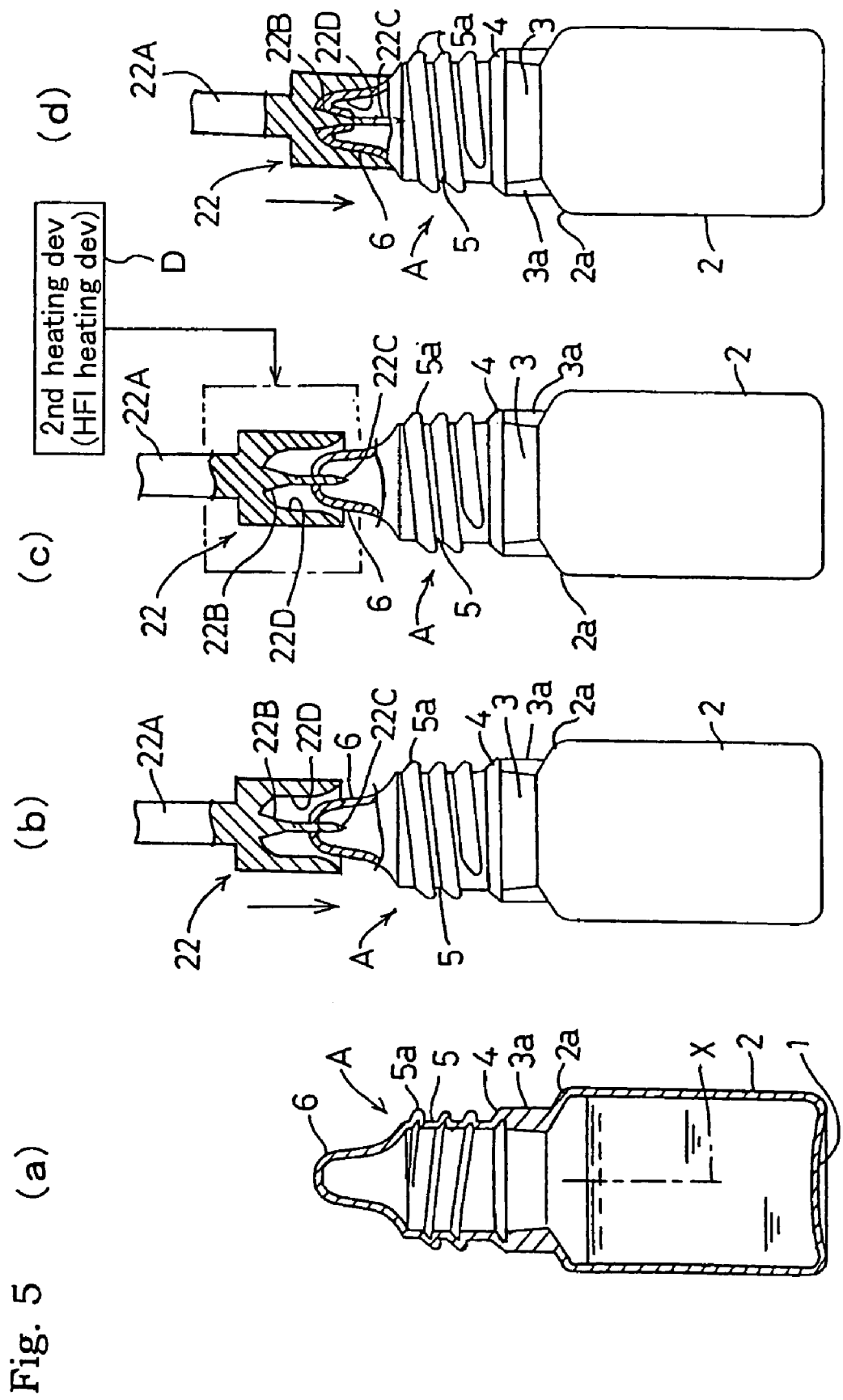
FIG. 5 is an explanatory view of the manufacturing method in the third mode.

In the manufacturing method of the third mode, as shown in FIGS. 5(a) and (b), the tip end of the instilling tube portion 6 of the container body A is not heated, but may be left at a forming temperature (70° C. to 80° C.) or may be allowed to cool to room temperature. The needle-like forming projection 22C for forming the small-diameter instilling hole 6c is caused to penetrate the tip end of the instilling tube portion 6 of the container body A, but short of forming the hollow 6b.

As shown in FIG. 5(c), the needle-like forming projection 22C that penetrates the tip end of the instilling tube portion 6 of the container body A is heated by a high frequency induction heating device which is one example of a second heating device D. The heating temperature should ideally be around a temperature for melting the container material, which usually is in the range of 120° C. to 200° C., and which, preferably, is controlled at around 160° C.

As shown in FIG. 5(d), the single forming die 22 which has the needle-like forming projection 22C and conical forming projection 22B is pushed in for 2 mm to 8 mm while being heated, to form the bottomed conical hollow 6b while pressing so as to compress the tip end of the instilling tube portion 6 of the container body A from the direction of container axis X.

Preferably, the conical forming projection 22B of the single forming die 22, is pushed in deep, but only to a range of 5 to 7 mm from a technical point of view. The single forming die 22 may have a vent hole for preventing bubbles entering the melted tip end of the instilling tube portion 6 of the container body A at this time (degassing is required since the resin at the tip end is fully melted).

As shown in FIG. 11(a), the mounting shaft 22A carrying the single forming die 22 is cooled by a cooling device E such as a water jacket or compressed air.

At the point where the single forming die 22 is cooled to a predetermined temperature, the single forming die 22 is withdrawn along the container axis X from the instilling tube portion 6 of the container body A where has been formed into the predetermined shape.

The single forming die 22 may be given surface treatment such as plating, Teflon coating or special plating to improve separability or releasability from the resin. This surface treatment, preferably, is the type that withstands a temperature of 280° C. or higher and is not easily separable.

The bottomed conical hollow 6b and the small-diameter instilling hole 6c formed at the tip end of the container body A by a manufacturing method of one of the three modes act as an inner nozzle tip. Each drop is in a steady quantity, bubbles are excluded from each drop, and bubble breaking is excellent.

In the second and third modes described above, the needle-like forming projection 21B or 21C of the needle-like forming die 21 is preheated by the second heating device D during the process of forming the small-diameter instilling hole 6c with the needle-like forming projection 21B or 21C. However, as previously described, in some cases the small-diameter instilling hole 6c can be formed with the needle-like forming projection 21B or 21C remaining at room temperature without such heating.

The manufacturing machine used in the manufacturing methods of the first to third modes will be described next.

As shown in FIGS. 6 through 11, the machine includes a transport and supply device F for supporting and transporting numerous container bodies A formed by blow molding or vacuum molding, along a linear supply path. A container feeding device G for successively feeding, along an arcuate feeding path, the container bodies A transported by the transport and supply device F. A grip and transfer device H for gripping the shoulders or adjacent parts of container bodies A fed by the container feeding device G, and transferring the container bodies A along an arcuate grip and transfer path while preventing horizontal and at least downward movement. And a container delivering device J for receiving processed container bodies A transferred along the arcuate grip and transfer path of the grip and transfer device H, and transferring them along an arcuate delivery path.

The container feeding device G includes the initial heating device C for heating part of the instilling tube portion 6 located at the tip of each container body A. The grip and transfer device H includes a switch device K for switching, between a standby position and a forming position. The convex forming die 20, needle-like forming die 21 or single forming die 22 are selectively applied to the tip ends of the container bodies A which are gripped and transferred by the grip and transfer device H, and a centering device L which can be switched between a position for fitting from the direction of container axis X on the tip end of each container body A, and a standby position separated from, the tip end projecting from a pair of gripper claws of the grip and transfer device H which grip and transfer the container body A. In addition, a high frequency induction heating device D which is one example of the second heating device, is located in an intermediate position along the arcuate grip and transfer path of the grip and transfer device H for heating the needle-like forming die 21 or single forming die 22.

Figure 6:
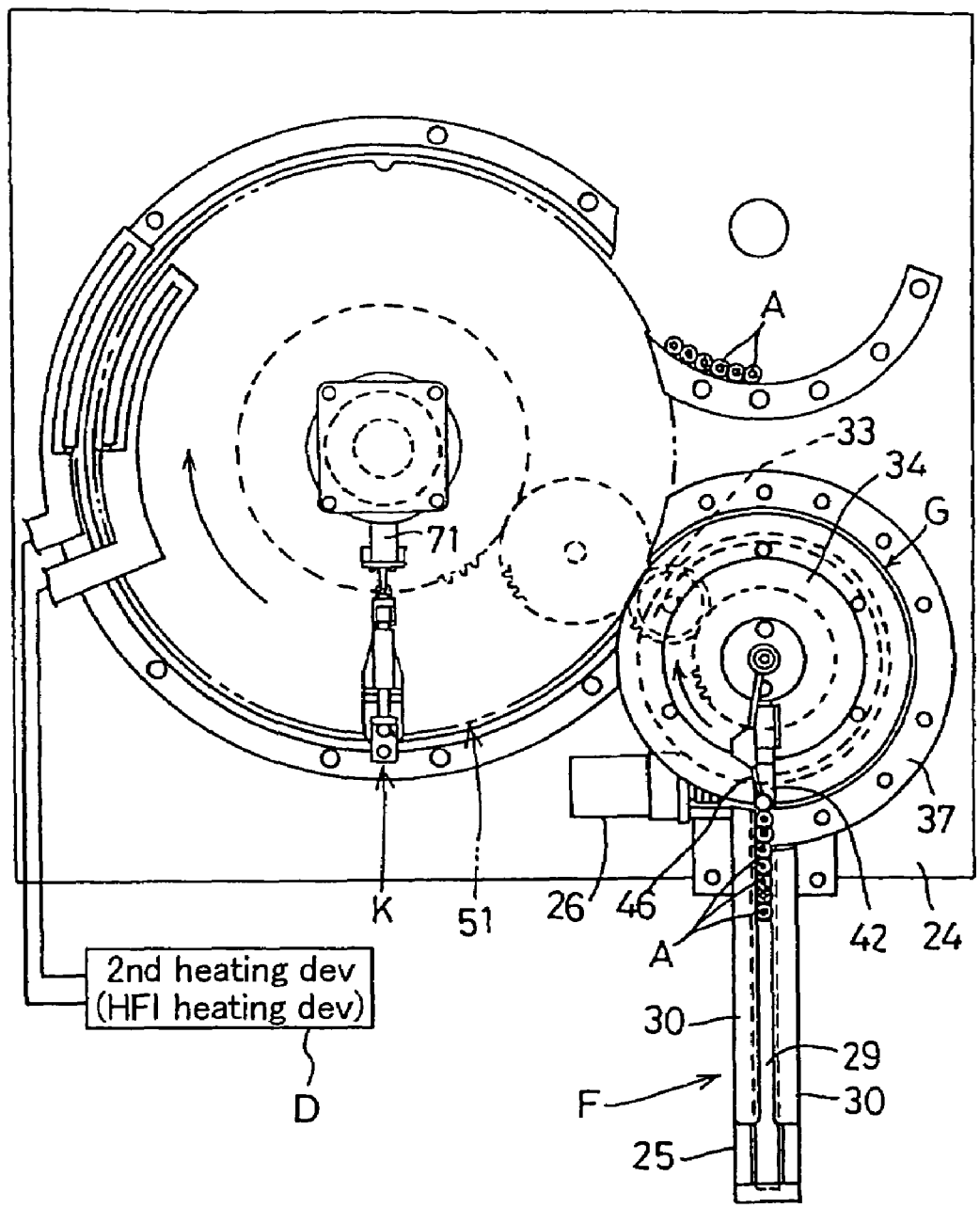
FIG. 6 is a schematic plan view showing the eye drop container manufacturing machine.

As shown in FIG. 6, the transport and supply device F includes a drive sprocket (not shown) interlocked to an electric motor 26 to be rotatable about a horizontal axis, and a driven sprocket (not shown) rotatable about a horizontal axis, which are located at longitudinally opposite ends of a transport frame 25 attached to a machine frame 24. An endless carrier 29 is wound around and extends between the two sprockets for supporting and transporting numerous container bodies A. A pair of right and left transport guide plates 30 are provided for guiding the container bodies A being transported on the endless carrier 29.

Figure 7:
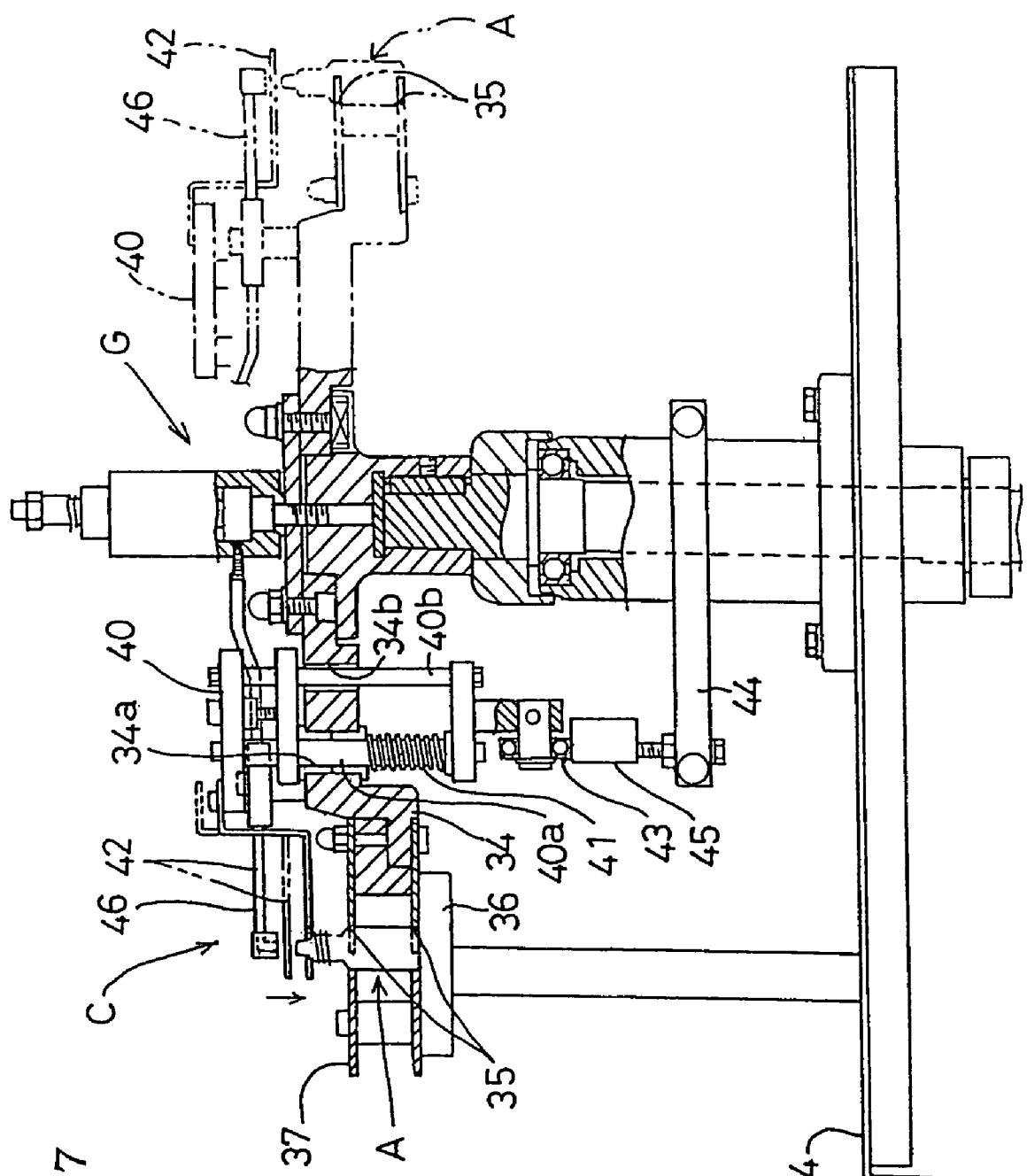
FIG. 7 is an enlarged sectional view of the container feeding device.

As shown in FIGS. 6 and 7, the container feeding device G includes a rotating plate 34 interlocked to an electric motor 33 to be rotatable about a vertical axis, and defined by a number of hollowed holders 35 arranged at fixed circumferential intervals for successively receiving and holding the container bodies A transported by the transport and supply device F, it also includes, a supporting guide plate 36 for supporting and guiding the bottoms of the container bodies A held in the respective holders 35, and a transfer guide 37 for preventing the container bodies A from moving radially outwardly from the respective holders 35.

The initial heating device C is used only at the time of manufacture in the first mode and second modes described previously, and is constructed as follows:

As shown in FIGS. 6 and 7, the rotating plate 34 of the container feeding device G includes a lift frame 40 located in each position (only one position being illustrated in the figures for conciseness) corresponding to the respective holders 35, and having a pair of lift guide rods 40a and 40b vertically slidable along a pair of through holes 34a formed in the rotating plate 34, and downwardly biased by a compression coil spring 41. Each lift frame 40 has a heat insulating plate 42 attached to the upper position thereof to be attachable to and detachable from a proximal portion of the instilling tube portion 6 of the container body A held in the holder 35, by moving along the container axis X.

A support member 44 on the machine frame 24 opposite the path of a roller 43 attached to the lower position of each lift frame 40, has a cam member 45 vertically mounted thereon for allowing the heat insulating plate 42 to descend to a heat insulating position fitted on the proximal portion of the instilling tube portion 6 of container body A. It is then transported from a container supply position of the transport and supply device F to a container transfer position on the grip and transfer device H. The heat is raised insulating plate 42 to a upwardly spaced standby position acting against the resilient restoring force of compression coil spring 41 when returning from the container transfer position to the container supply position.

In addition, the rotating plate 34 of the container feeding device G includes a hot air supply pipe 46 located in each of the positions corresponding to the respective holders 35 for supplying hot air at 200° C. to 500° C. to the top of the instilling tube portion 6 at the tip end of the container body A held in each holder 35.

Figure 8:
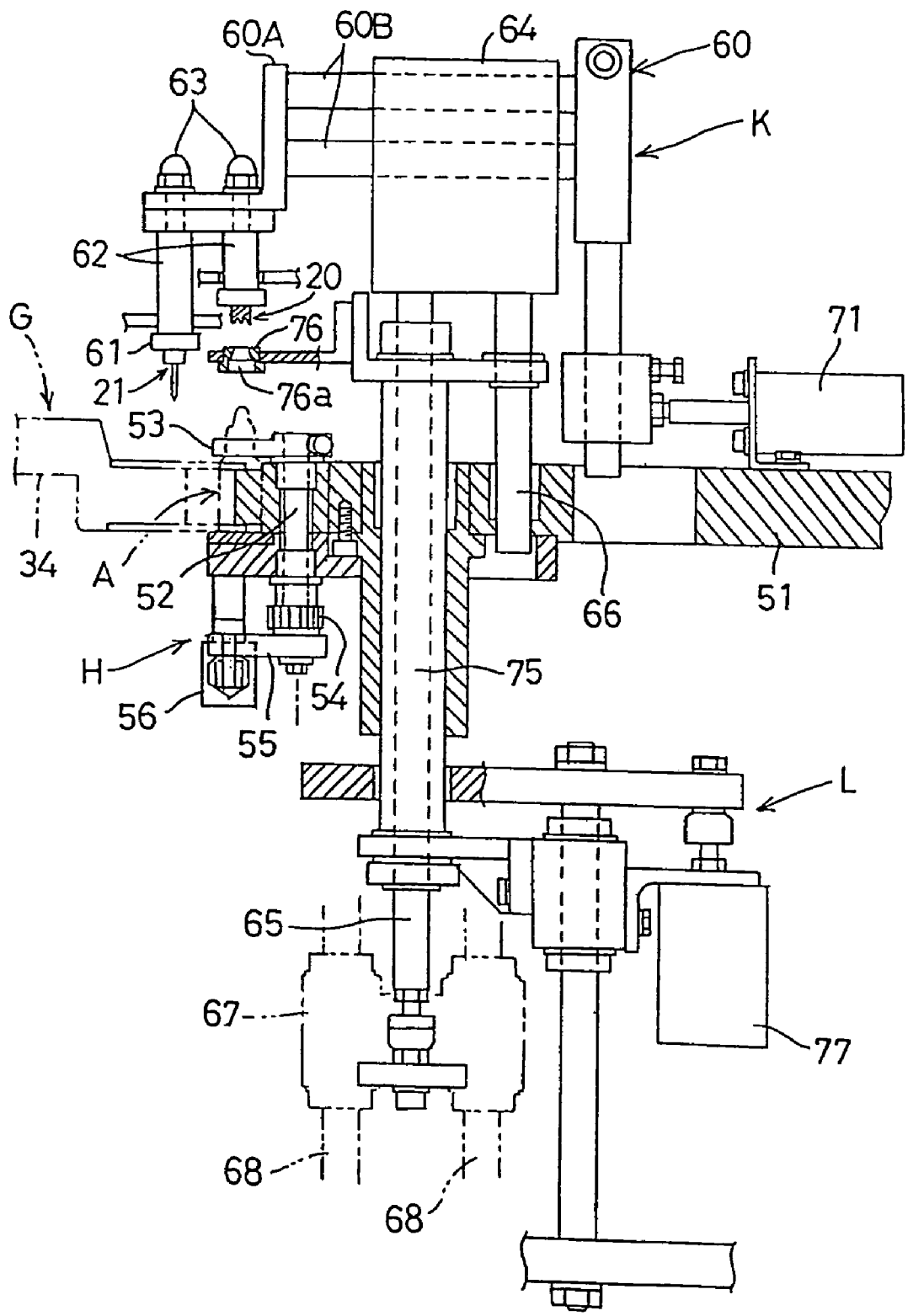
FIG. 8 is an enlarged sectional view of a grip and transfer device, a switch device and a centering device.
Figure 10:
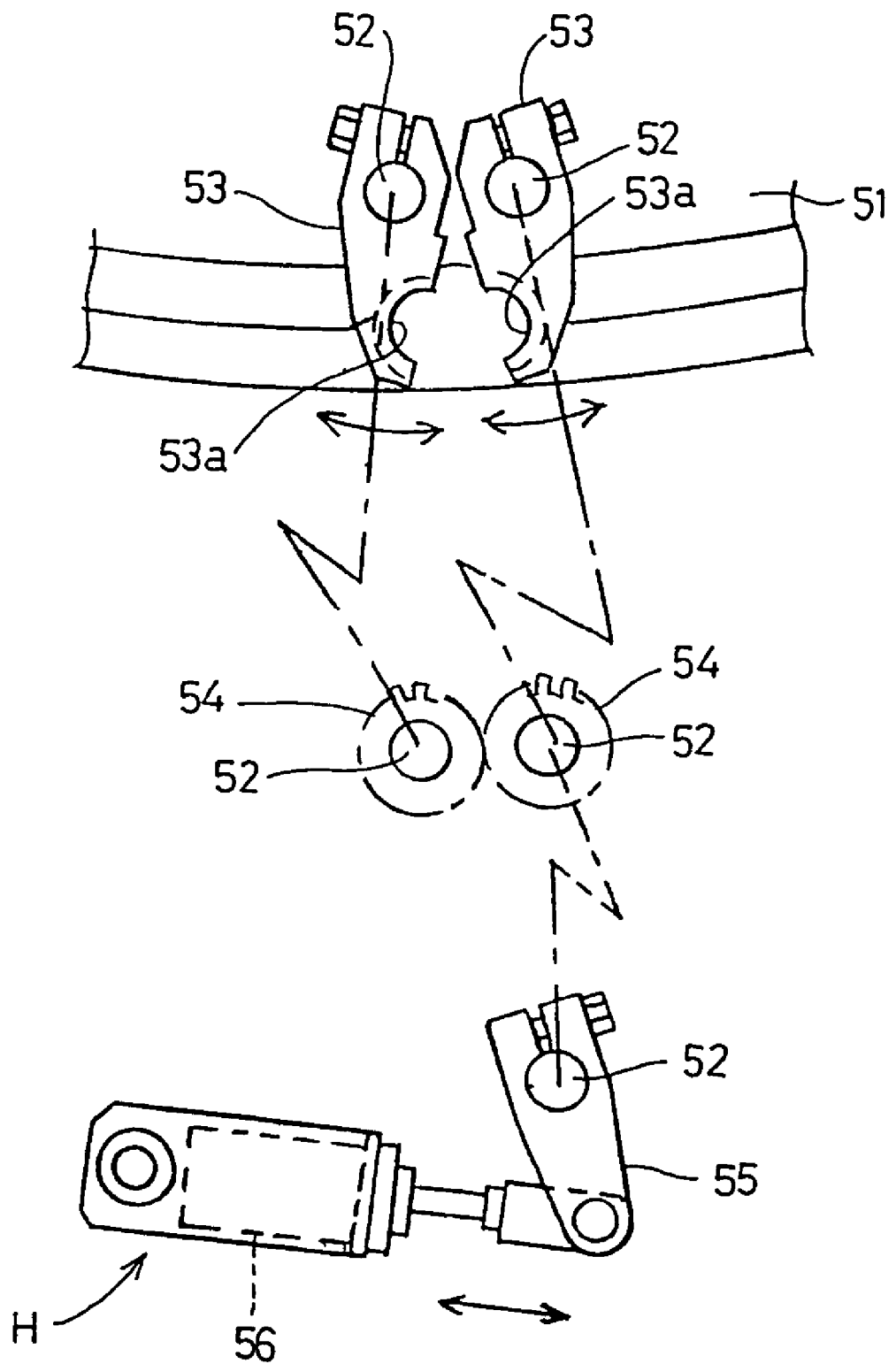
FIG. 10 is a view of the drive system for gripper claws.

As shown in FIGS. 6, 8 and 10, the grip and transfer device H includes a rotating plate 51 interlocked to an electric motor 50 which rotates about a vertical axis, and supporting, in each of the peripheral positions (only one position being illustrated in the figures for conciseness) at predetermined intervals in a rotating direction, a pair of actuating shafts 42 rotatable about the vertical axes extending parallel to an axis of rotation of the rotating plate 51. The actuating shafts 42 have a pair of gripper claws 43 attached to the upper ends thereof and defining semicircular arc gripping surfaces 53a for horizontally engaging and gripping the neck portion 3 forming an annular groove of container body A. The actuating shafts 42 have gears 54 mounted fixedly thereon and meshed with each other. Further, a fluid cylinder 56 is disposed between an actuating arm 55 fixed to one of the actuating shafts 42 and the rotating plate 51 for opening and closing the pair of gripper claws 43.

A supporting and sliding guide plate 57 is provided for supporting and sliding the bottom 1 of the container body A, gripped and transferred by the two gripper claws 43, and a transfer guide member 58 is provided for preventing the container body A gripped and transferred by the gripper claws 43 from moving radially outward.

When the neck portion 3 of container body A is gripped by the pair of gripper claws 43, the container body A is prevented from moving horizontally and forced to move downward. Consequently, an alignment of the container bodies A and the convex forming die 20, needle-like forming die 21 or single forming die 22 interchangeably attached by the switch device K may be effected with increased precision. It is also possible to check a reduction in the precision of shaping the bottomed conical hollow 6*b* and small-diameter instilling hole 6*c* due to an elastic deformation in the container axis X of the container body A caused by pressure applied from the die.

Figure 9:
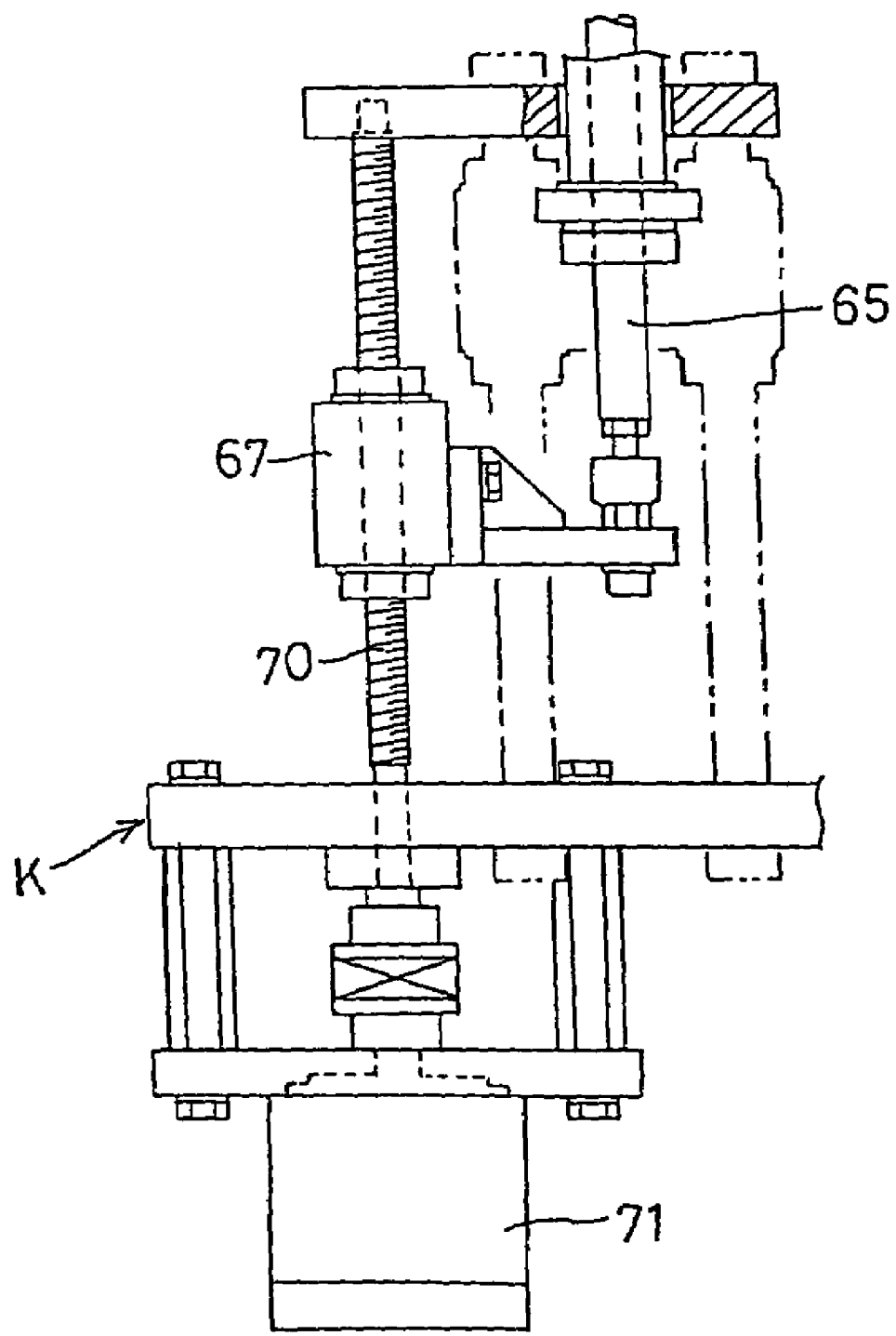
FIG. 9 is an enlarged view of the principal portion of the switch device.

As shown in FIGS. 8 and 9, the switch device K includes a movable frame 60 reciprocable radially and vertically in each of positions (only one position being illustrated in the figures for conciseness) of the rotating plate 51 corresponding to the gripper claws 43. The movable frame 60 has two holder tubular shafts 62 removably attached, through nuts 63, to two positions radially with respect to the rotating direction of mounting portion 60A at the tip end thereof and defining shaft receiving openings directed downward. A nut 61 is screwed to the shaft receiving opening of each holder tubular shaft 62 for selectively and interchangeably holding the mounting shaft 20A of the convex forming die 20, the mounting shaft 21A of needle-like forming die 21 or the mounting shaft 22A of the single forming die 22.

A lift block 64 slidably holding two horizontal slide rods 60B of a movable frame 60 has two vertical slide rods 65 and 66, of different lengths, extending downward to be vertically slidable relative to the rotating plate 51. The longer slide rod 65 has a lower end thereof connected to a lift connector 67 slidable along a pair of lift guide rods 68 attached to the machine frame 24. The lift connector 67 has a screw shaft 70 vertically extending through and meshed with a transversed middle position thereof, and interlocked to an electric motor 69 fixed to the machine frame 24. Further, a fluid cylinder 71 is attached to the rotating plate 51 for radially sliding the movable frame 60 relative to the lift block 64.

The first holder tubular shaft 62, which is the shorter of the two holder tubular shafts 62 and is disposed radially inwardly with respect to the rotating direction, has an axis for aligning with the axis X of the container body A gripped by the pair of gripper claws 43. When actuating the convex forming die 20, the needle-like forming die 21 or single forming die 22 selectively attached to the longer, second holder tubular shaft 62 disposed radially inwardly with respect to the rotating direction, the fluid cylinder 71 is operated and controlled to cause a sliding movement to move the axis of the second holder tubular shaft 62 into agreement with the axis X of container body A gripped by the pair of gripper claws 43.

When actuating the convex forming die 20, the needle-like forming die 21 or the single forming die 22 selectively attached to the two holder tubular shafts 62, the electric motor 69 is driven and controlled to lower the movable frame 60 to a predetermined amount to switch the forming die from the standby position to the forming position.

Figure 11:
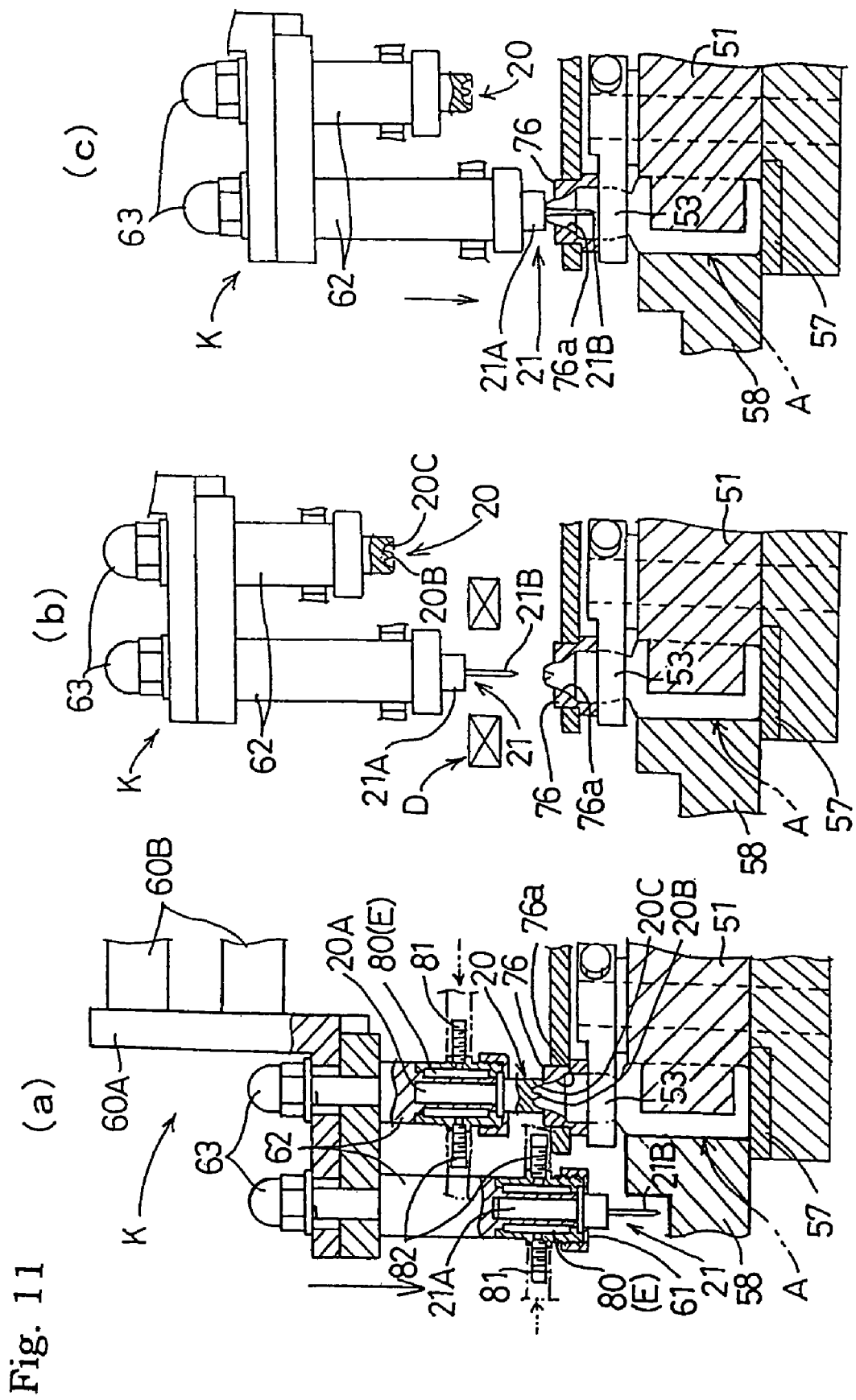
FIG. 11 is an enlarged sectional view of the principal portion showing the manufacturing steps according to the first mode.

As shown in FIGS. 8 and 11, the centering device L has a centering ring 76 attached to upper positions of the movable tubes 75 mounted to be slidable along the vertical slide rods 65 and 66, and defining a fitting bore 76*a* for fitting, from the direction of container axis X on the threaded tube portion 5 of the container body A gripped by the pair of gripper claws 43. A fluid cylinder 77 is mounted between the movable tubes 75 and the machine frame 24 for switching the centering ring 76 between a centering position for fitting on the threaded tube portion 5 of the container body A and a standby position spaced upward therefrom.

As shown in FIG. 11(*a*), each of the two holder tubular shafts 62 has a water jacket 80 acting as the cooling device E, a water supply connection pipe 81 for supplying cooling water to the water jacket 80, and a drain connection pipe 82 for draining the cooling water from the water jacket 80.

The following functions and effects are realized by the construction, as described above, including the grip and transfer device H for gripping the shoulders or adjacent parts of the container bodies A with a liquid filled therein and sealed simultaneously during the molding process, and transferring the container bodies A along the path while preventing any horizontal movement and forcing downward movement thereof, and the switch device K for switching, between the standby position and forming position, the convex forming die 20 for forming the hollow 6*b*, and the needle-like forming die 21 for forming the instilling holes 6*c*, which are selectively applied to the tip ends of the container bodies A gripped and transferred by the grip and transfer device H.

Using the container body A formed of a thermoplastic material (bottle pack type container body in which a liquid is filled and sealed simultaneously by blow molding, vacuum molding or the like, the bottomed conical hollow 6*b* having an inside diameter enlarging toward the tip end, and the small-diameter instilling hole 6*c* for controlling, to a set quantity, the liquid pushed out of the container body A, are formed directly in the tip end of container body A. Thus, less dies are required for manufacturing the container body than an eye drop container using an injection-molded inner nozzle tip. The presence of a bottomed conical hollow 6*b* and small-diameter instilling hole 6*c* allows a fixed quantity of liquid to be dripped reliably whenever the container body A is pressed.

Moreover, when forming the bottomed conical hollow 6*b* and small-diameter instilling hole 6*c* in the tip end of container body A gripped and transferred by the grip and transfer device H, by switching the convex forming die 20 and needle-like forming die 21 from the standby position to the forming position, the grip and transfer device H grips the shoulder or adjacent part of container body A and prevents the container body from moving horizontally and forcing it downward. Consequently, the bottomed conical hollow 6*b* and small-diameter instilling hole 6*c* are aligned to the container body A with high precision. It is also possible to check the reduction in the precision of shaping the bottomed conical hollow 6*b* and small-diameter instilling hole 6*c* due to an elastic deformation in the container axis X of container body A.

Thus, while realizing an improved precision for shaping the bottomed conical hollow 6*b* and small-diameter instilling hole 6*c* to instill a fixed quantity of liquid reliably whenever the container body A is pressed, the low manufacturing cost, which is the advantage of the bottle pack type container body A may be further lowered.

The following functions and effects are realized by the construction, as described above, including the centering device L switchable between the position for fitting from the direction of the container axis X on the tip end of each container body A, and the standby position separated therefrom, the tip end projecting from the gripper claws of the grip and transfer device H.

By fitting the centering device L from the direction of the container axis X on the tip end of the container body A gripped by the gripper claws 43 of the grip and transfer device H, the bottomed conical hollow 6*b* and small-diameter instilling hole 6*c* are aligned with the container body A with increased precision. A further improvement may be achieved in the precision for shaping the bottomed conical hollow 6*b* and small-diameter instilling hole 6*c* to drip and apply a fixed quantity of liquid reliably whenever the container body A is pressed.

Further, as described above, the high frequency induction heating device D is disposed in an intermediate position on the grip and transfer path of the grip and transfer device H for heating the forming dies, the high frequency induction heating device D disposed in an intermediate position on the transfer path can quickly heat the forming dies to a predetermined heating temperature while the grip and transfer device H continuously grips and transfers the container bodies A. Consequently, the yield may be improved while promoting the improvement in manufacturing efficiency and machining precision.

What is claimed is:

1. An eye drop container, comprising:
   a flexible hollow body portion having a closed end for containing a liquid therein; and
   a dispensing body portion having a tip end spaced from the closed end of the hollow body portion, with the liquid free to move within the container between the flexible hollow body portion and the dispensing body portion, the dispensing body portion, comprising:
      a first hollow body segment having an external circular surface and an opposite internal circular surface, with the external circular surface having decreasing diameter as the distance from the tip end decreases to have the smallest diameter at the tip end, and the internal circular surface having decreasing diameter as the distance from the tip end decreases; and
      a second body segment extending from the tip end into the first segment, the second segment having an outside circular surface and an opposite internal surface, with the internal surfaces of the first and second segments facing one another, spaced from one another, and the external surface of the second segment having increasing diameter as the distance from the tip end decreases, with the second segment at a predetermined distance from the tip end terminating in a small-diameter instilling hole, the internal surface of the second body segment providing a passageway, wherein the passageway has no obstruction such that the liquid is free to move through the passageway and out of the tip end,
   wherein said hollow body portion and the dispensing body portion are integrally and unitarily formed as one piece to form a blow-mold product or a vacuum-mold product,
   wherein the tip end of the external surface has a bowl-shaped curved surface that is free of burrs, and
   wherein applying a predetermined pressure to the body portion moves a predetermined amount of the fluid in the container through the instilling hole.

2. The eye drop container as defined in claim 1, wherein said dispensing body portion has a threaded portion formed integral therewith for detachable meshing a cap to seal the second body segment of the of the dispensing body portion.

3. The eye drop container as defined in claim 1, wherein said second body segment has a depth in a range of 2 to 7 mm.

4. The eye drop container as defined in claim 1, wherein said second body segment has an opening diameter adjacent the tip end in a range of 2 to 4 mm.

5. The eye drop container as defined in claim 1, further comprising a cap detachably secured to the dispensing body portion, the cap comprising an internal nib shaped to engage selected portions of the external walls of the second body segment when the cap is securely mounted on the hollow body portion.

6. The eye drop container as defined in claim 1, wherein the internal surface of the second body segment are circular, with the diameter of the internal surface of the second body segment decreases as the distance from the tip end increases.

7. The eye drop container as defined in claim 6, wherein outer surface portion of the hollow body portion adjacent the dispensing body portion has external threaded portion formed integrally therewith, and further comprising a cap having an open end, internal threads sized to mesh with external threaded portion of hollow body portion, and a closed end having a nib shaped to engage selected portions of the external walls of the second body segment when the threads of the cap are detachably meshed with the threaded portion of the hollow body portion.

8. The eye drop container as defined in claim 1, wherein the tip end of the external surface has a bowl-shaped curved surface formed by elimination of burrs produced by the blow molding or the vacuum molding.

9. The eye drop container as defined in claim 1, wherein the second body segment is terminated at a predetermined distance from the tip end to have a shape for forming a small-diameter instilling hole penetrated through the second body segment, the small-diameter instilling hole being capable of controlling, at a set quantity, the liquid pushed out of the flexible hollow body portion.

* * * * *

UNITED STATES PATENT AND TRADEMARK OFFICE
CERTIFICATE OF CORRECTION

| | |
|---|---|
| PATENT NO. | : 7,438,704 B1 |
| APPLICATION NO. | : 10/049733 |
| DATED | : October 21, 2008 |
| INVENTOR(S) | : Kawashima et al. |

Page 1 of 1

It is certified that error appears in the above-identified patent and that said Letters Patent is hereby corrected as shown below:

Column 14, Line 4, Claim 2, "of the of the" should read -- of the --

Column 14, Line 17, Claim 6, "are circular" should read -- is circular --
Line 19, Claim 6, "decreases as" should read -- decreasing as --

Signed and Sealed this

Third Day of March, 2009

JOHN DOLL
*Acting Director of the United States Patent and Trademark Office*